(12) United States Patent
Takemoto

(10) Patent No.: US 7,546,174 B2
(45) Date of Patent: Jun. 9, 2009

(54) DIGITAL DATA REPRODUCTION APPARATUS CAPABLE OF REPRODUCING AUDIO DATA, AND CONTROL METHOD THEREOF

(75) Inventor: Makoto Takemoto, Daito (JP)

(73) Assignee: Funai Electric Co., Ltd., Osaka (JP)

(*) Notice: Subject to any disclaimer, the term of this patent is extended or adjusted under 35 U.S.C. 154(b) by 633 days.

(21) Appl. No.: 11/103,670

(22) Filed: Apr. 12, 2005

(65) Prior Publication Data

US 2005/0232603 A1 Oct. 20, 2005

(30) Foreign Application Priority Data

Apr. 16, 2004 (JP) .............................. 2004-121845

(51) Int. Cl.
*G06F 17/00* (2006.01)
*G11B 5/00* (2006.01)
*G11B 7/00* (2006.01)

(52) U.S. Cl. .............. 700/94; 369/4; 369/5; 369/30.23; 710/52; 710/69; 386/96; 386/97; 386/98; 386/99

(58) Field of Classification Search ..................... 700/94
See application file for complete search history.

(56) References Cited

U.S. PATENT DOCUMENTS

| | | | | |
|---|---|---|---|---|
| 5,436,875 A | * | 7/1995 | Shinada ..................... | 369/30.23 |
| 5,457,667 A | * | 10/1995 | Kojima et al. ............. | 369/59.26 |
| 5,519,681 A | * | 5/1996 | Maeda et al. ............. | 369/47.16 |
| 5,754,660 A | * | 5/1998 | Shimizu ...................... | 381/17 |
| 5,860,060 A | | 1/1999 | Li et al. | |
| 5,862,229 A | * | 1/1999 | Shimizu ...................... | 381/17 |
| 6,005,612 A | * | 12/1999 | Kikuchi et al. ............ | 348/222.1 |
| 6,018,506 A | * | 1/2000 | Okabe et al. ............. | 369/30.23 |
| 6,061,655 A | * | 5/2000 | Xue et al. ................... | 704/500 |
| 6,070,201 A | * | 5/2000 | Tanaka et al. ............. | 710/52 |
| 6,178,147 B1 | | 1/2001 | Fujinami | |
| 6,393,578 B1 | * | 5/2002 | Swidler et al. ............. | 713/600 |
| 6,751,170 B2 | * | 6/2004 | Ueki ....................... | 369/32.01 |

(Continued)

FOREIGN PATENT DOCUMENTS

EP 0 552 806 7/1993

(Continued)

OTHER PUBLICATIONS

Japanese Office Action for Japanese Application No. 2004-121845, mailed on Jan. 22, 2008 (4 pages).

(Continued)

*Primary Examiner*—Curtis Kuntz
*Assistant Examiner*—Paul Mccord
(74) *Attorney, Agent, or Firm*—Osha Liang LLP

(57) ABSTRACT

Audio data recorded on a hard disk is stored in a memory by a CPU. The audio data stored in the memory is stored in units of channels to be output, in corresponding storage areas within an audio data storage portion by the CPU. As such, in the audio data storage portion, the audio data is stored in different storage areas for respective channels to be output. The audio data stored in the audio data storage portion is converted to analog data by a D/A converter, and output to a prescribed device.

2 Claims, 3 Drawing Sheets

U.S. PATENT DOCUMENTS

| | | | |
|---|---|---|---|
| 6,823,310 B2 * | 11/2004 | Ishito et al. | 704/270 |
| 6,925,035 B2 * | 8/2005 | Ueki | 369/32.01 |
| 6,925,340 B1 * | 8/2005 | Suito et al. | 700/94 |
| 7,039,477 B1 * | 5/2006 | Kamiya et al. | 700/94 |
| 7,065,031 B2 * | 6/2006 | Sako | 369/94 |
| 2001/0027399 A1 * | 10/2001 | Yasushi et al. | 704/278 |
| 2002/0106197 A1 * | 8/2002 | Boyle | 386/111 |
| 2002/0133249 A1 * | 9/2002 | Fay et al. | 700/94 |
| 2004/0047253 A1 * | 3/2004 | Yako | 369/47.16 |

FOREIGN PATENT DOCUMENTS

| | | |
|---|---|---|
| EP | 0 633 570 | 1/1995 |
| JP | 05-167948 | 7/1993 |
| JP | 2001-298680 | 10/2001 |
| JP | 2004-318467 | 11/2004 |
| JP | 2005-143028 | 6/2005 |

OTHER PUBLICATIONS

Patent Abstracts of Japan for Japanese Publication No. 2004-318467, Publication date Nov. 11, 2004 (1 page).

Patent Abstracts of Japan for Japanese Publication No. 2005-143028, Publication date Jun. 2, 2005 (1 page).

Patent Abstracts of Japan, Publication No. 2001-298680 dated Oct. 26, 2001, 1 page.

Patent Abstracts of Japan, Publication No. 05-167948 dated Jul. 2, 1993, 1 page.

European Search Report for European Application No. EP 05 00 7410 mailed on Jul. 13, 2005, 3 pages.

* cited by examiner

DIGITAL DATA REPRODUCTION APPARATUS CAPABLE OF REPRODUCING AUDIO DATA, AND CONTROL METHOD THEREOF

BACKGROUND OF THE INVENTION

1. Field of the Invention

The present invention relates to apparatuses for reproducing digital data, and more particularly to a digital data reproduction apparatus characterized by a manner of handling audio data upon reproduction of digital data.

2. Description of the Background Art

A conventional way of reproducing audio data upon reproduction of digital data is explained with reference to FIGS. 5A and 5B. Digital data 100 is recorded on a recording medium as shown in FIG. 5A. For reproduction of audio data included in digital data 100, the audio data is read by a reproduction apparatus and copied as audio data 101 to a prescribed memory in the reproduction apparatus. It is then converted to analog data of two channels (right channel and left channel) by an audio D/A (Digital/Analog) converter 102 and input to an audio mixer 103. In audio mixer 103, it is converted to audio data to be output through a right channel and a left channel and sent to an external speaker or the like. Sound is then output to reproduce the audio data.

As the techniques concerning reproduction of digital data, various techniques for handling audio data have conventionally been disclosed.

For example, Japanese Patent Laying-Open No. 2001-298680 discloses a technique where an audio signal consisting of a plurality of audio events to which different audio channels are assigned, is used as a broadcast signal. A function for down-mixing them is introduced, and down-mix coefficients for the respective channels are sent out. A receiver uses them to perform a down mix in accordance with the output pattern, to thereby carry out control for the respective voice events.

Further, Japanese Patent Laying-Open No. 05-167948 discloses a technique where, in a satellite broadcast receiving apparatus, an output of a D/A converter is reset at the time of turning on a power supply or at the time of switching channels, to muffle abnormal noise caused at those times.

With the above-described techniques, particularly in accordance with the one disclosed in Japanese Patent Laying-Open No. 05-167948, it is unnecessary to provide a satellite broadcast receiving apparatus with a mute transistor or the like for rejecting the abnormal noise as described above. As such, there is always a demand to reduce the number of components in an apparatus for reproducing digital data, as is in any apparatuses.

SUMMARY OF THE INVENTION

The present invention has been made in view of the foregoing, and its object is to further reduce the number of components in a digital data reproduction apparatus.

A digital data reproduction apparatus according to an aspect of the present invention includes: a memory for temporarily storing audio data within digital data recorded on a recording medium; a digital/analog converter connected to the memory and also connected to a sound output device; and a data processor causing the memory to store the audio data recorded on the recording medium. In this digital data reproduction apparatus, the data processor carries out special processing that is performed on the audio data stored in the memory such that data included in the audio data stored in the memory is output through an intended channel in the sound output device, and sends the audio data having undergone the special processing to the digital/analog converter.

A control method of a digital data reproduction apparatus according to the present invention includes: the step of storing audio data recorded on a recording medium in a prescribed memory; and the step of performing special processing on the audio data stored in the prescribed memory to cause data included in the audio data stored in the prescribed memory to be output through an intended channel in a sound output device.

A digital data reproduction apparatus according to another aspect of the present invention includes: a digital/analog converter connected to a memory and also connected to a sound output device; and a data processor causing the memory to store audio data recorded on a recording medium, performing special processing on the stored audio data, and sending the audio data having undergone the special processing to the digital/analog converter. The memory includes a first area and a second area for storing data. The special processing is processing performed such that, of the audio data stored in the memory, data to be output through a first channel in the sound output device is stored in the first area, and data to be output through a second channel different from the first channel in the sound output device is stored in the second area. The digital/analog converter converts the data stored in the first area into analog data and sends the analog data to the sound output device as data to be output through the first channel, and converts the data stored in the second area into analog data and sends the analog data to the sound output device as data to be output through the second channel.

According to the present invention, in the digital data reproduction apparatus, audio data stored in a memory is firstly subjected to processing (special processing) to cause data included in the audio data to be output device intended channels, and then converted to analog data and transmitted to a sound output device. This means that it is unnecessary to provide an audio mixer that was conventionally required to distribute audio data, having been converted to analog data, to channels to be output therethrough. Accordingly, it is possible to further reduce the number of components in the digital data reproduction apparatus.

Moreover, according to the present invention, distribution of the audio data to be output through two different channels is carried out by storing relevant data included in the audio data in two different areas within a memory. This simplifies the process of distributing the audio data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an information recording and reproduction apparatus according to an embodiment of the present invention will be described in detail with reference to the drawings.

Figure 1:
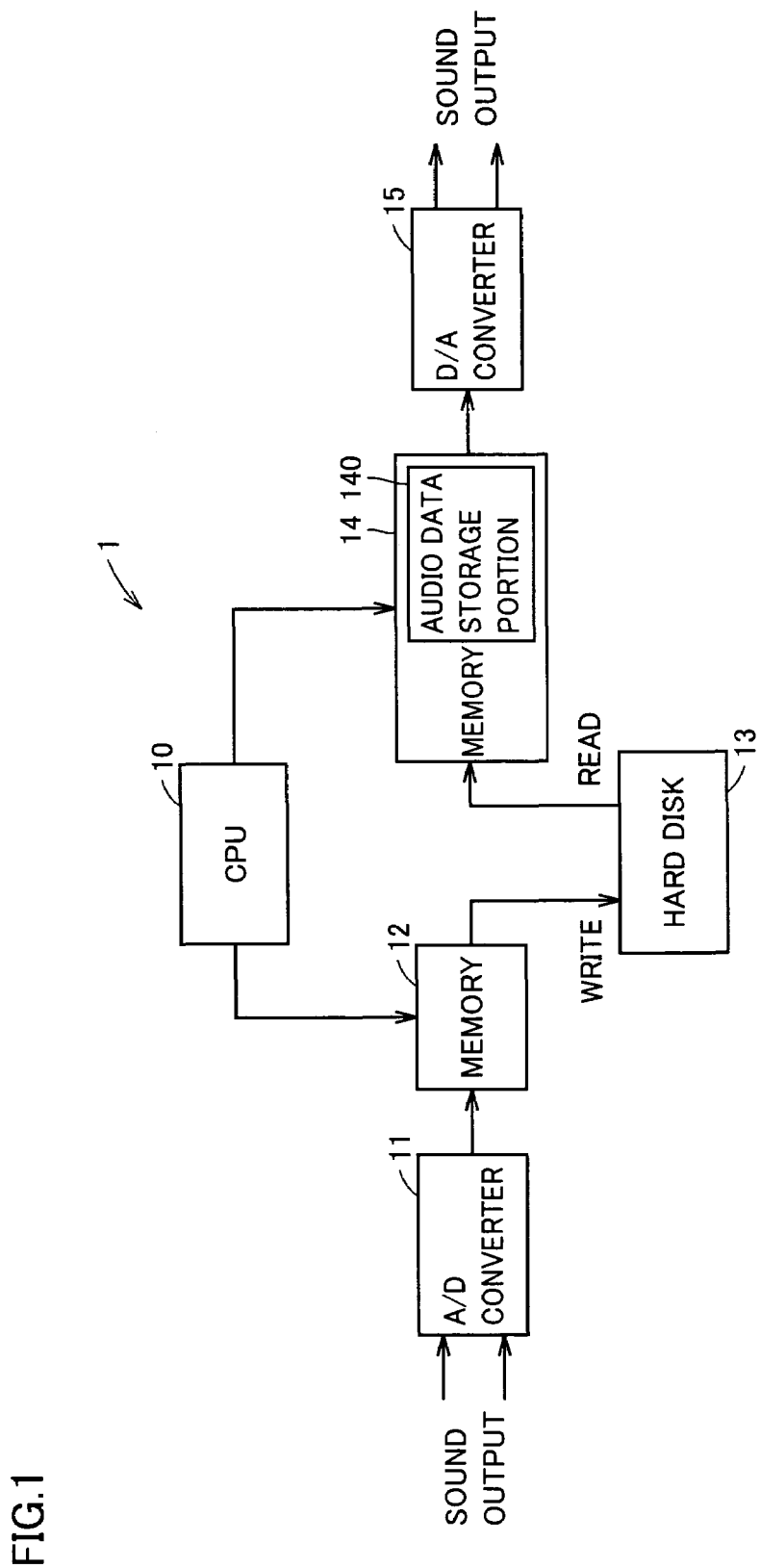
FIG. 1 schematically shows a configuration of a portion related to reproduction of audio data in an information recording and reproduction apparatus according to an embodiment of the present invention.

Referring to FIG. 1, in the information recording and reproduction apparatus 1, when audio data of an analog format is input to an A/D (Analog/Digital) converter 11, the audio data is converted to digital data, and temporarily stored in a memory 12, and written to a hard disk 13 for recording. A CPU (Central Processing Unit) 10 controls the writing to hard disk 13.

When a command to read the audio data recorded on hard disk 13 is output from CPU 10, the audio data recorded on hard disk 13 is stored in a memory 14. Memory 14 includes therein an audio data storage portion 140 having different storage areas for respective channels to be output. CPU 10 stores the audio data in memory 14, and then stores the audio data in units of channels to be output, in the corresponding storage areas within audio data storage portion 140.

The audio data stored in the respective storage areas of audio data storage portion 140 are sent by CPU 10 to a D/A converter 15, where they are converted to analog data before being output to a prescribed device. When information recording and reproduction apparatus 1 includes an analog audio circuit and a speaker, the audio data converted to the analog data by D/A converter 15 is output to the analog audio circuit.

The way of storing the audio data in the respective storage areas of audio data storage portion 140 described above is now explained in more detail with reference to FIGS. 2-4, assuming the case where audio data is recorded on hard disk 13 in two channels, as right channel audio data and left channel audio data, and the audio data is output through two channels.

When audio data is recorded on hard disk 13 in the above-described manner, right channel audio data and left channel audio data are stored in memory 14 as well.

Figure 2:
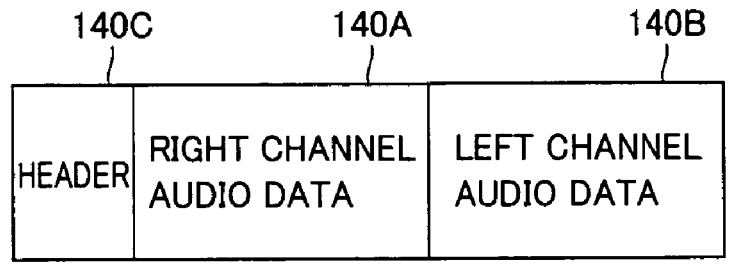
FIGS. 2-4 illustrate how audio data is stored in respective storage areas in an audio data storage portion in the information recording and reproduction apparatus shown in FIG. 1.

In the case where the right channel audio data is to be output through a right channel and the left channel audio data is to be output through a left channel, CPU 10 controls such that the right channel audio data is stored in an area 140A, the left channel audio data is stored in an area 140B, and a header is stored in an area 140C in audio data storage portion 140, as shown in FIG. 2.

Figure 3:
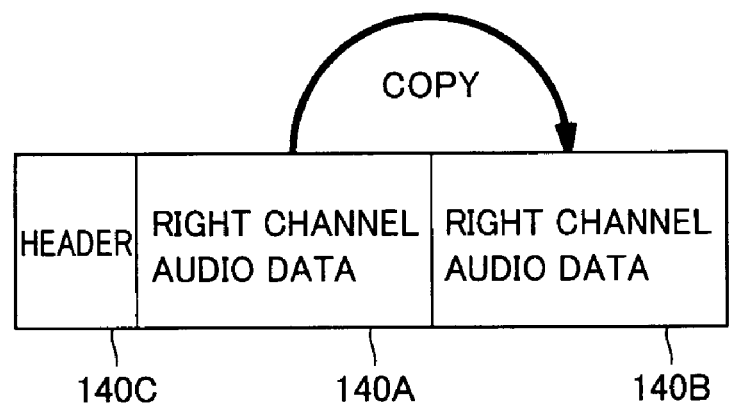

In the case where the right channel audio data and the left channel audio data are both to be output through a right channel, CPU 10 controls such that the right channel audio data is stored in area 140A, the right channel audio data is copied and stored in area 140B as well, and a header is stored in area 140C in audio data storage portion 140, as shown in FIG. 3.

Figure 4:
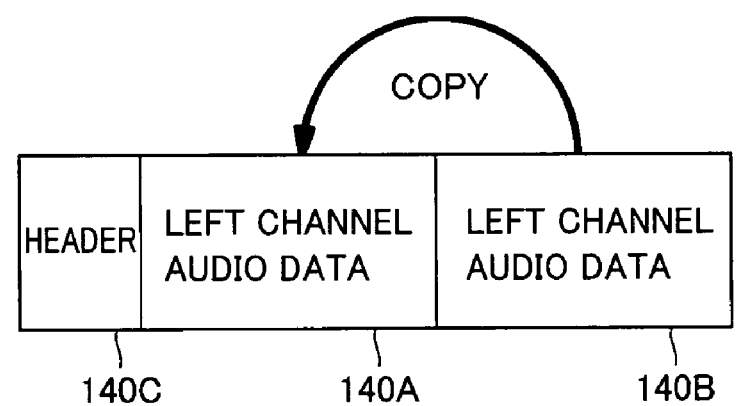
Figure 5A:
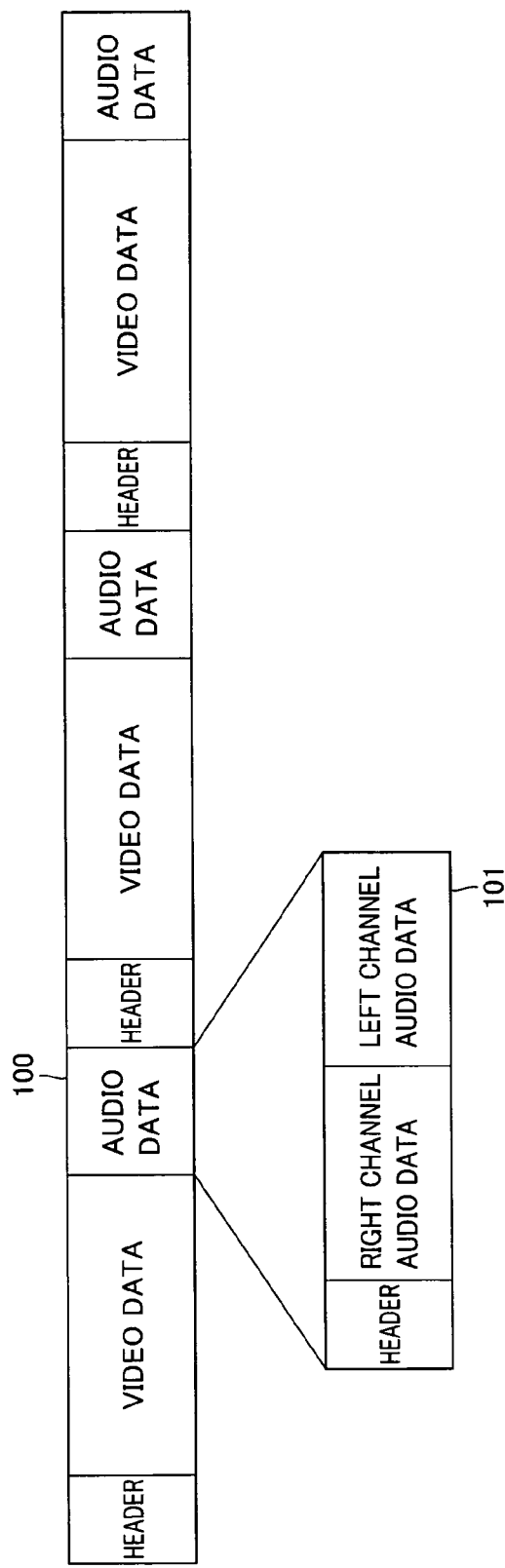
FIG. 5A illustrates how data including audio data is stored in a conventional art, and FIG. 5B schematically shows a part of a configuration of a conventional apparatus for processing audio data.
Figure 5B:
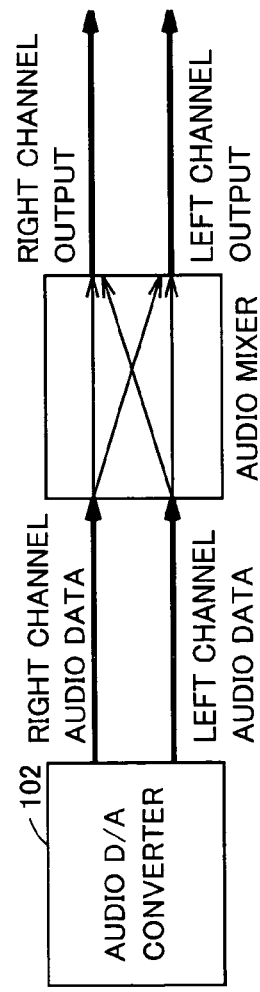

Further, in the case where the right channel audio data and the left channel audio data are both to be output through a left channel, CPU 10 controls such that the left channel audio data is stored in area 140B, the left channel audio data is copied and stored in area 140A as well, and a header is stored in area 140C in audio data storage portion 140, as shown in FIG. 4.

In the embodiment described above, the right channel audio data and the left channel audio data may be audio data to be output from a right speaker and a left speaker, respectively, of a pair of speakers. Alternatively, they may be audio data of different languages.

In the embodiment described above, the information recording and reproduction apparatus has been explained as an example of the digital data reproduction apparatus. However, the digital data reproduction apparatus of the present invention does not necessarily have to be provided with a recording function.

Further, the audio data to be read does not necessarily have to be recorded on a hard disk. It may be recorded, for example, on a recording medium of a disk type detachable with respect to the digital data reproduction apparatus.

All that is needed for the digital data reproduction apparatus to which the present invention is applicable is that it is capable of handling sound as digital data. More specifically, it may be any of a hard disk recorder, a DVD (Digital Versatile Disk) player, a DVD recorder, a digital broadcast receiver, a CD (Compact Disk) player, and others. It is noted that the present invention is not applicable to an apparatus such as a video tape recorder and a cassette tape recorder that cannot handle sound as digital data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital data reproduction apparatus, comprising:
a memory for temporarily storing audio data within digital data recorded on a recording medium;
a digital/analog converter connected to the memory and also connected to a sound output device; and
a data processor causing the memory to store the audio data recorded on the recording medium, wherein
the data processor performs special processing on the audio data stored in the memory such that processed audio data is output through an intended channel of the sound output device,
the data processor sends the processed audio data to the digital/analog converter,
the memory includes a first area for storing first channel digital data and a second area for storing second channel digital data,
the special processing is processing that stores a portion of the processed audio data to be output through a first channel of the sound output device as first channel digital data in the first area, and stores a portion of the processed audio data to be output through a second channel of the sound output device as second channel digital data in the second area,
the digital/analog converter converts the first channel digital data stored in the first area into first channel analog data and sends the first channel analog data to the sound output device to be output through the first channel, and converts the second channel digital data stored in the second area into second channel analog data and sends the second channel analog data to the sound output device to be output through the second channel,
the first channel digital data stored in the first area is copied and stored in the second area when the first channel digital data is to be output through the second channel, and
the second channel digital data stored in the second area is copied and stored in the first area when the second channel digital data is to be output through the first channel.

2. A control method of a digital data reproduction apparatus, comprising the steps of:
storing audio data recorded on a recording medium in a prescribed memory;

performing special processing on the audio data stored in the prescribed memory to cause processed audio data to be output through an intended channel in a sound output device, wherein the special processing is processing that stores a portion of The processed audio data to be output through a first channel of the sound output device as first channel digital data in a first area of the prescribed memory, and stores a portion of the processed audio data to be output through a second channel of the sound output device as second channel digital data in a second area of the prescribed memory;

after completion of the special processing, converting the first channel digital data stored in the first area into first channel analog data and sending the first channel analog data to the sound output device to be output through the first channel;

after completion of the special processing, converting the second channel data stored in the second area into second channel analog data and sending the second channel analog data to the sound output device to be output through the second channel;

copying and storing the first channel digital data stored in the first area, in the second area when the first channel digital data stored in the first area is to be output through the second channel; and copying and storing the second channel digital data stored in the second area, in the first area when the second channel digital data stored in the second area is to be output through the first channel.

* * * * *